(12) United States Patent
Colombo et al.

(10) Patent No.: US 7,484,543 B2
(45) Date of Patent: Feb. 3, 2009

(54) TIRE WITH TREAD HAVING CONTINUOUS RIB

(75) Inventors: Gianfranco Colombo, Concorezzo (IT); Giancarlo Cucco, Villa Cortese (IT); Vito Bello, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 103 days.

(21) Appl. No.: 10/473,304

(22) PCT Filed: Mar. 8, 2002

(86) PCT No.: PCT/EP02/02552

§ 371 (c)(1),
(2), (4) Date: Mar. 9, 2004

(87) PCT Pub. No.: WO02/078982

PCT Pub. Date: Oct. 10, 2002

(65) Prior Publication Data

US 2005/0076985 A1 Apr. 14, 2005

Related U.S. Application Data

(60) Provisional application No. 60/280,762, filed on Apr. 3, 2001.

(30) Foreign Application Priority Data

Mar. 30, 2001 (EP) .................................. 01201232

(51) Int. Cl.
*B60C 11/03* (2006.01)

(52) U.S. Cl. .............................. 152/209.8; 152/209.18; 152/209.28; 152/901

(58) Field of Classification Search .............. 152/209.1, 152/209.18, 209.28, 902, 209.8, 209.9, 900–903; D12/507–511, 515–524, 539–543, 547–556, D12/574–578, 582–591
See application file for complete search history.

(56) References Cited

U.S. PATENT DOCUMENTS

D71,229 S * 10/1926 Vance ........................ D12/575

(Continued)

FOREIGN PATENT DOCUMENTS

DM 048371 9/1999

(Continued)

OTHER PUBLICATIONS

Machine translation for Japan 7-290909.*

*Primary Examiner*—Steven D Maki
(74) *Attorney, Agent, or Firm*—Finnegan, Henderson, Farabow, Garrett & Dunner, LLP

(57) ABSTRACT

A tyre for a motor car includes a tread and two shoulders. The tread includes at least one circumferential row of blocks disposed between first and second circumferential grooves. Each of the blocks is delimited by a section of the first circumferential groove and by first and second transverse grooves that extend from the first circumferential groove and converge at a common vertex spaced from the second circumferential groove. The common vertex is separated from the second circumferential groove by a continuous circumferential tread rib. A second transverse groove that delimits a first block is separated from a first transverse groove that delimits a circumferentially adjacent block by a solid tread portion. The solid tread portion extends from the first circumferential groove to the circumferential tread rib and forms a single body with the circumferential tread rib, spacing the first block and the circumferentially adjacent block from each other.

21 Claims, 14 Drawing Sheets

U.S. PATENT DOCUMENTS

| | | | |
|---|---|---|---|
| 2,100,084 A * | 11/1937 | McNeill | 152/901 |
| 4,057,089 A * | 11/1977 | Johannsen | 152/209.28 |
| 4,832,099 A * | 5/1989 | Matsumoto | 152/209.28 |
| D388,039 S * | 12/1997 | Ratliff, Jr. | D12/564 |
| 5,851,322 A * | 12/1998 | Hayashi | 152/DIG. 3 |
| 6,499,520 B1 * | 12/2002 | Yoshioka et al. | 152/209.28 |
| D481,991 S * | 11/2003 | Graas et al. | D12/585 |
| 6,892,775 B1 * | 5/2005 | Himuro | 152/209.28 |

FOREIGN PATENT DOCUMENTS

| | | | |
|---|---|---|---|
| EP | 565270 | * | 10/1993 |
| EP | 0 611 667 A1 | | 8/1994 |
| EP | 0 812 709 A1 | | 12/1997 |
| EP | 0 855 291 A2 | | 7/1998 |
| EP | 0 867 310 A2 | | 9/1998 |
| JP | 5-338415 | * | 12/1993 |
| JP | 06 199109 | | 7/1994 |
| JP | 07 285303 | | 10/1995 |
| JP | 07 290909 | | 11/1995 |
| JP | 11 334317 | | 12/1999 |
| JP | 2004-345405 | * | 12/2004 |

* cited by examiner

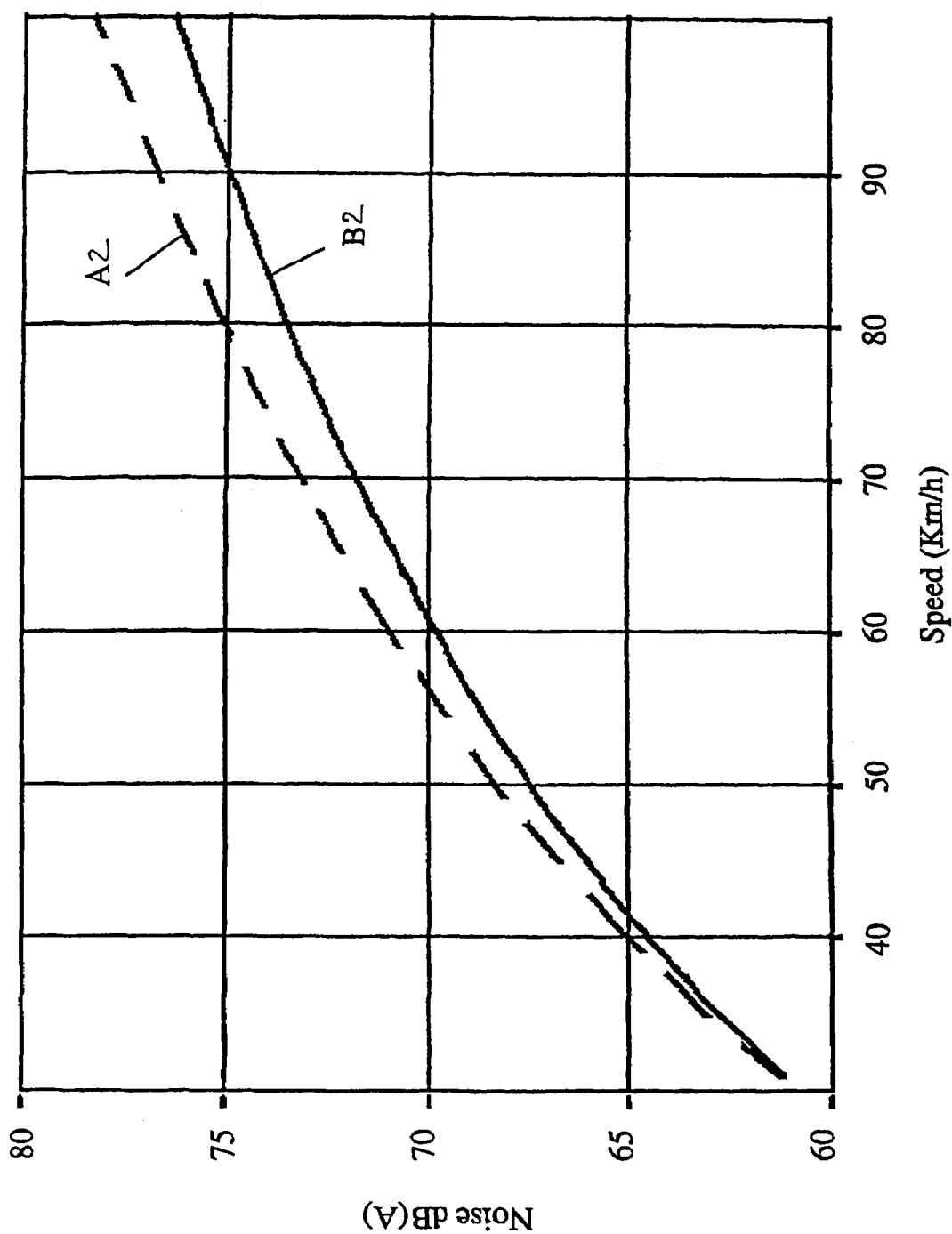

TIRE WITH TREAD HAVING CONTINUOUS RIB

CROSS-REFERENCE TO RELATED APPLICATIONS

This application is a national-phase entry under 35 U.S.C. § 371 from International Application No. PCT/EP02/02552, filed Mar. 8, 2002, in the European Patent Office, the contents of which are relied upon and incorporated herein by reference; additionally, Applicants claim the right of priority under 35 U.S.C. § 119(a)-(d) based on patent application No. 01201232.4, flied Mar. 30, 2001, in the European Patent Office; further, Applicants claim the benefit under 35 U.S.C. § 119(e) based on provisional application No. 60/280,762, filed Apr. 3, 2001, in the U.S. Patent and Trademark Office.

BACKGROUND OF THE INVENTION

1. Field of the Invention

The present invention relates to a tyre for a motor car. In particular, a high-performance motor car.

2. Description of the Related Art

Motor vehicle tyres having a tread provided with blocks delimited by circumferential grooves extending in a substantially longitudinal direction and by transverse grooves extending in a substantially axial direction are known. The blocks resulting from the intersection of said grooves are formed in various suitably designed shapes and are arranged in adjacent circumferential rows, each of which is located between two successive circumferential grooves.

The circumferential grooves may influence the directional and travel stability properties of the tyre in relation to the lateral (slip) thrusts directed parallel to the rotation axis of the tyre.

The transverse grooves, in turn, may influence the tractional properties of the tyre, namely its capacity to transmit efficiently to the road surface the tangential thrusts parallel to the direction of travel during acceleration and braking of the motor vehicle.

The circumferential and transverse grooves may also influence the draining of the water in the area making contact with the road surface (footprint area) during travel on a wet road surface.

In any case, the presence of transverse and circumferential grooves influences the rolling noise of the tyre. In fact, one of the main causes of noisiness is the continuous succession of impacts of the edges of the blocks on the road surface.

A further cause of noisiness consists in dragging of the blocks on the road surface when they enter and leave the area of contact with the road surface. This dragging is due essentially to the deformation of the tread both when the tyre is flattened against the road surface and when it recovers its inflated condition, as it leaves the area of contact with the road surface.

The deformations of the tread when coming into contact with and leaving the area of contact with the road surface also produce a cyclical volumetric variation of the grooves which delimit the blocks and a consequent cyclical action of compression and expansion of the air trapped inside the grooves. These phenomena of compression and expansion of the air increase the rolling noise of the tyre.

Various measures which tend to limit the rolling noise of a tyre are known. One of these consists in providing the blocks with different longitudinal dimensions, by adopting two or more different pitch values distributed in circumferential succession—called "pitch sequence"—such as to provide the maximum possible lack of uniformity over the circumferential extension of the tread. The object is to distribute the acoustic energy due to the impacts and dragging of the blocks over a wide spectrum of frequencies, thus avoiding concentrating it in a specific frequency and producing bothersome noise.

The noisiness of a tyre, measured in accordance with the standard ISO/TC 31/SC No. 623, is considered unacceptable when it exceeds the following limits:

| | |
|---|---|
| tire width ≦145 | 72 dB(A) |
| tire width >145 and ≦165 | 73 dB(A) |
| tire width >165 and ≦185 | 74 dB(A) |
| tire width >185 and ≦215 | 75 dB(A) |
| tire width >215 | 76 dB(A) |

The noisiness of tyres is a problem which is difficult to solve because some measures which tend to reduce it adversely affect the directional, tractional and water drainage properties.

For example, in order to improve the water drainage properties, the transverse grooves should be steep, namely they should have a small inclination with respect to the circumferential grooves. On the other hand, in order to improve the uniformity of travel and the response time on a dry road, the transverse channels should have a large inclination with respect to the circumferential grooves, namely should be substantially perpendicular to the longitudinal grooves. However, transverse grooves which are very inclined worsen the rolling noise of the tyre.

Moreover, sounds with a frequency of less than 1500 Hz, or more particularly less than 1000 Hz, are much more noticeable inside a car than outside, while sounds with a frequency greater than 1500 Hz are much more noticeable outside a car.

Therefore, it is not possible to obtain a low noise level both inside and outside the car and it is difficult to achieve in each case the best possible compromise.

EP-812,709 describes a tyre having a tread comprising two regions at least one of which is provided with a plurality of inclined main grooves, each of which comprises a segment with a steep inclination and a segment with a slight inclination. A lateral band of the two regions has an auxiliary groove with a steep inclination communicating with two adjacent, inclined, main grooves and an auxiliary groove with a slight inclination, situated between the two adjacent, inclined, main grooves.

In a first embodiment, the inclined main grooves extend from a circumferential groove close to the equatorial plane of the tyre, while in a second embodiment they have a blind bottom.

In a third embodiment, the steeply inclined segments of two adjacent, inclined, main grooves are joined by a thin transverse groove.

EP-867,310 describes a tyre comprising blocks formed in a tread portion by means of a plurality of circumferential grooves and a plurality of directionally inclined grooves. At least some of the directionally inclined grooves extend from a circumferential groove close to the equatorial plane of the tyre and extend towards one end of the area of the tread making contact with the ground. Each of the blocks has an angled portion which forms an acute angle of 10°-60° defined by a circumferential groove and a directionally inclined groove. The surface of the angled portion of the block is chamfered over a distance of 10-30 mm from a tapered end thereof in a longitudinal direction so as to vary gradually towards a portion of larger width.

In the tread of both the abovementioned documents, each inclined groove delimits a block and the adjacent one located circumferentially alongside. Namely, each directionally inclined groove separates two adjacent consecutive blocks and is common to them.

The result is that both the abovementioned treads have circumferential rows of sickle-shaped adjacent blocks which are separated only by a pitch equal to the sum of the length, in the circumferential direction, of a block and of the adjacent inclined groove.

SUMMARY OF THE INVENTION

However, the inventors of the present invention have perceived that the presence of a considerable number of inclined grooves leading into a longitudinal groove, and their arrangement close to each other, adversely affects the rolling noise of the tyre.

One object of the present invention is a tyre which combines low noisiness both inside and outside a vehicle, with an excellent performance on wet and dry road surfaces.

The present invention relates to a motor car tyre having an equatorial plane and comprising a tread and two shoulders, said tread having at least one circumferential row of blocks located between a first and a second circumferential groove, characterized in that each of said blocks is delimited by a section of said first circumferential groove and by a first and a second transverse groove which extend from said first circumferential groove and converge at a common vertex spaced from said second circumferential groove, said common vertex being separated from said second circumferential groove by means of a continuous circumferential tread rib, said second transverse groove which delimits a block being separated from a first transverse groove which delimits an immediately following block by a solid tread portion which extends from said first circumferential groove as far as said circumferential rib, forming a single body with said circumferential rib and spacing said block and the immediately following block from each other.

Preferably, at least one of said first and second transverse grooves has an increasing width in the direction from said common vertex towards said first circumferential groove.

In one embodiment, at least one of said first and second transverse grooves is sickle-shaped.

Preferably, at least one of said first and second transverse grooves has a median line formed by an arc of a circle having a predefined radius of curvature.

Advantageously, said median line has a first section having a direction substantially parallel to said equatorial plane, a second section having a predefined inclination with respect to said first circumferential groove and a linking section which joins together said first and second sections.

In another embodiment, at least one of said first and second transverse grooves has a first section having a direction substantially parallel to said equatorial plane, a second section having a predefined inclination with respect to said first circumferential groove and a linking section which joins together said first and second sections.

Advantageously, each block of said at least one row of blocks is shaped in the form of a shark's fin.

Preferably, the common vertices of said first and second transverse grooves of said at least one row of blocks have the same orientation in the longitudinal direction.

Typically, said tread has a central circumferential row of blocks and a first and a second lateral circumferential row of blocks.

In one embodiment, the common vertices of said first and second transverse groove of said first lateral row of blocks has an orientation opposite to that of the common vertices of said first and second transverse grooves of said central row and second lateral row of blocks.

In another embodiment, the common vertices of said first and second transverse grooves of said three rows of blocks have the same orientation.

Typically, said tread has a first and a second lateral circumferential row of blocks and two central circumferential ribs separated by a middle circumferential groove.

Preferably, the common vertices of said first lateral row of blocks has an orientation opposite to that of the common vertices of said second lateral row of blocks.

Advantageously, said first and second transverse grooves of at least one of said first and second lateral circumferential rows of blocks extend beyond the respective first circumferential groove and extend into an axially internal region of one of said shoulders.

Typically, at least one of said shoulders has, in an axially external region, pairs of additional transverse grooves converging towards a common vertex.

Advantageously, said additional converging transverse grooves are separated from said first circumferential groove by solid portions of elastomeric material.

Typically, said additional converging transverse grooves extend from said first circumferential groove.

Advantageously, an axially internal region of a shoulder has a void/solid ratio smaller than that of the axially internal region of the other shoulder and is positioned on the outer side of said motor car when said tyre is mounted on said motor car.

The tyre according to the invention ensures a high grip on wet road surfaces, very low noise level values both inside and outside the car, a high level of comfort and good handling on dry road surfaces.

In particular, in wet road conditions, where the grip is low, the tread according to the invention ensures proper drainage of the water without affecting the road holding performance, even at high speeds, both in the longitudinal direction and in the transverse (lateral) direction. This behaviour is demonstrated by the aquaplaning test around bends, during which the lateral acceleration and the maximum speed which the tyre is able to reach before loss of grip occurs, is measured. When travelling along a road curvilinear section in very wet conditions, the tyre according to the invention maintains for a longer period of time the ideal grip conditions with an increase in speed, compared to a comparative tyre.

Moreover, during lateral acceleration, there is a marked improvement in the maximum acceleration value and the maximum speed value on a wet road surface.

Therefore, the tyre according to the invention and the motorcar to which it is fitted have an optimum behaviour in wet road conditions, ensuring greater driving safety.

The high adherence between tyre and wet road surface also ensures shorter braking distances, thus improving the performance of the motor car to which the tyre is fitted.

In the present description and the accompanying claims, the term "groove" is understood as meaning a recess having a width not smaller than 1.5 mm.

BRIEF DESCRIPTION OF THE DRAWINGS

Characteristic features and advantages of the invention will now be described with reference to embodiments illustrated by way of non-limiting examples in the accompanying figures in which:

FIGS. 8-14 are graphs which show the results of tests carried out with the tyre according to FIG. 1 and with the comparative tyre according to FIG. 7.

DETAILED DESCRIPTION OF THE EXEMPLARY EMBODIMENTS

Figure 1:
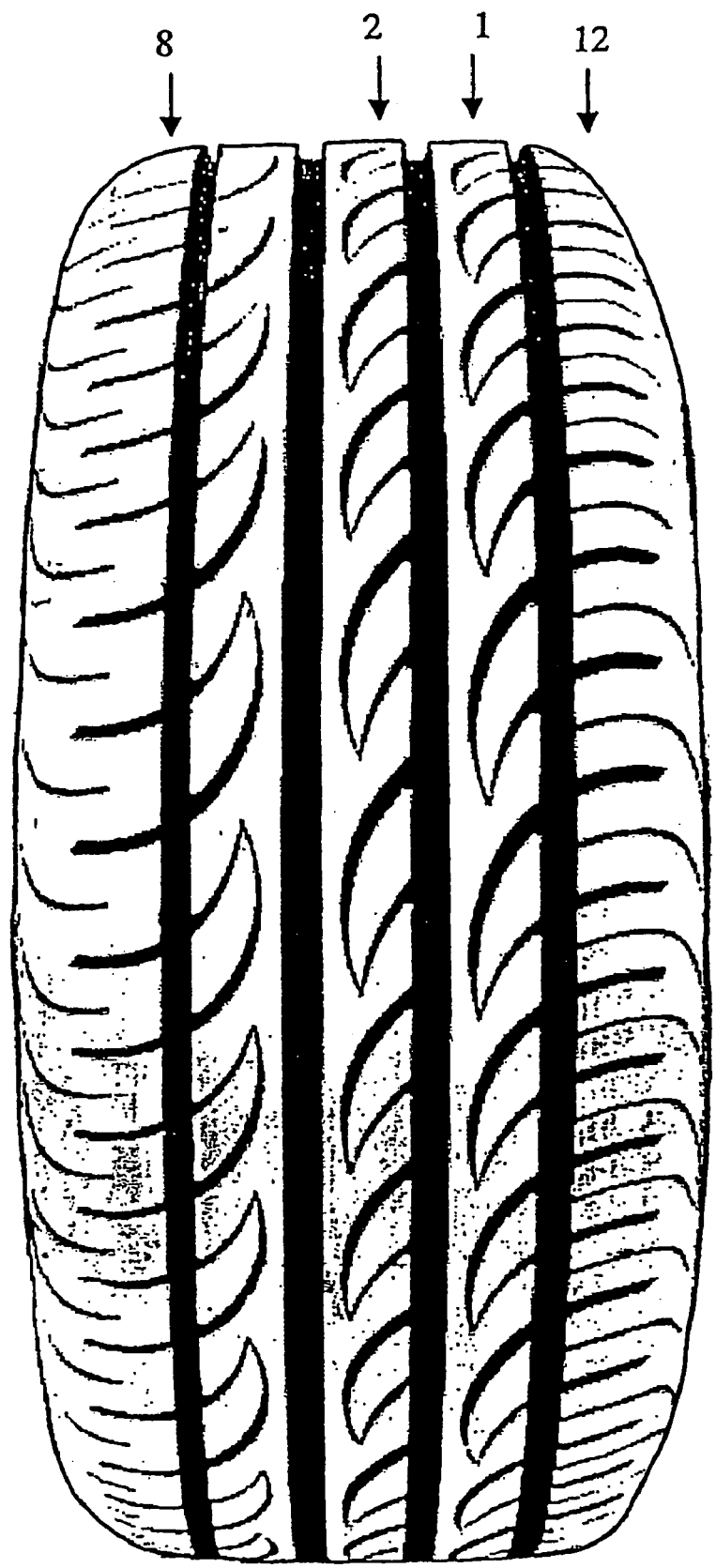
FIG. 1 is a front view of a tyre having a tread provided in accordance with the invention.
Figure 2:
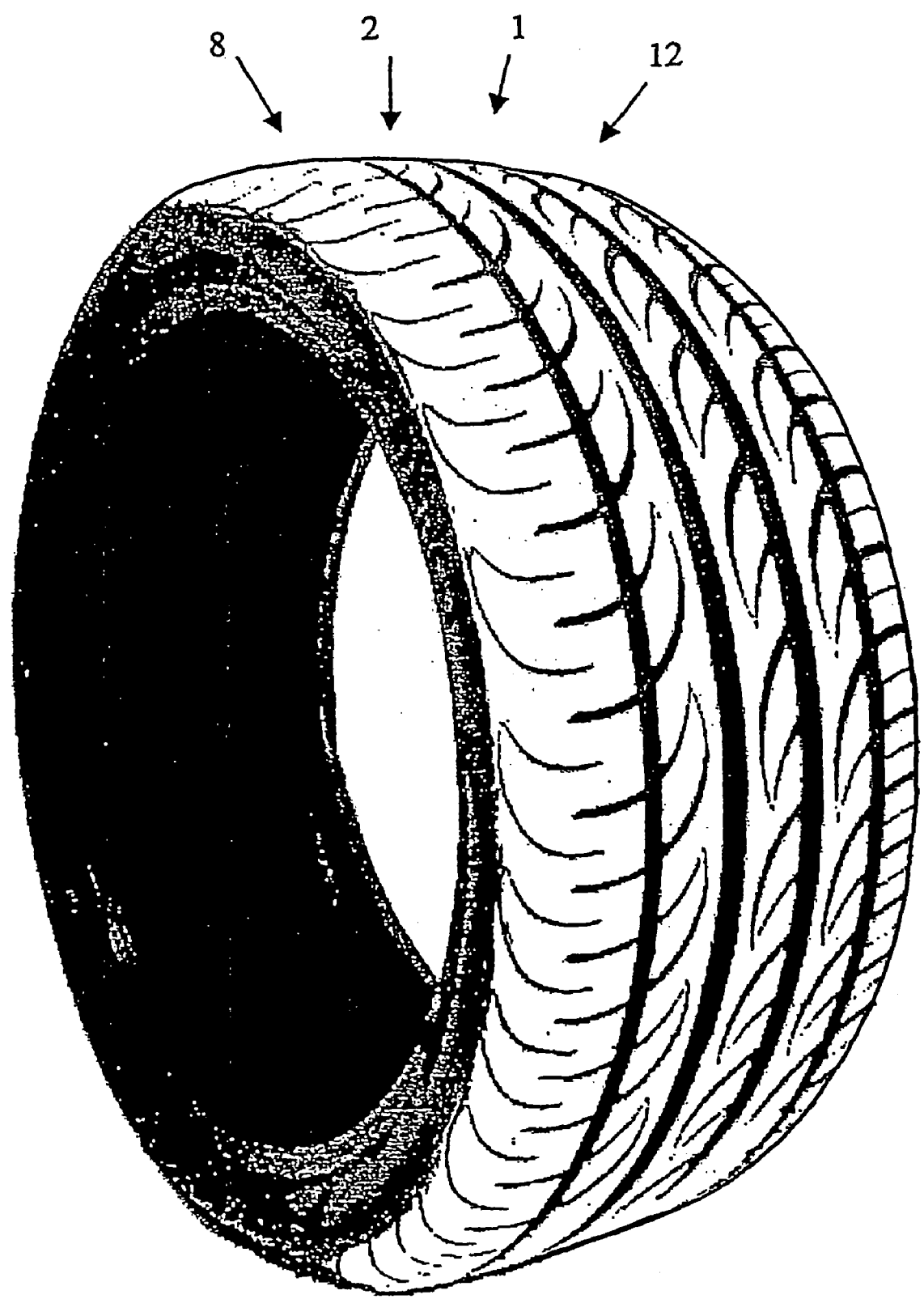
FIG. 2 is a perspective view of the tyre according to FIG. 1.

FIGS. 1 and 2 show a tyre 1 with a tread 2 axially delimited by two shoulders 8 and 12. The tread 2 is provided with circumferential grooves 3, 4, 5 and 6 (FIG. 3) which extend in longitudinal direction and are parallel to an equatorial plane 7 of the tyre. The tread 2 includes three circumferential rows of blocks 9, 10 and 11, a central row 10 and two lateral rows 9 and 11. The shoulder 8 is separated from the row of blocks 9 by means of the circumferential groove 3. The row of blocks 9 is located between the circumferential grooves 3 and 4. The row of blocks 10 is located between the circumferential grooves 4 and 5. The row of blocks 11 is located between the circumferential grooves 5 and 6. The shoulder 12 is separated from the row of blocks 11 by means of the groove 6.

The shoulders 8 and 12 comprise an axially internal region 108 and 112, respectively, said axially internal region being closer to the equatorial plane and influencing the performance of the tyre, and an axially external region 208 and 212, respectively, said axially external region being close to one sidewall and not affecting the performance of the tyre.

The circumferential grooves 3, 4, 5 and 6 have a width which ranges from about 6 mm to about 15 mm and a depth which ranges from about 5 mm to about 11 mm. In the case of the tread 2 according to FIGS. 1-3, the circumferential groove 3 has a smaller width, of 9 mm, and depth of 8.2 mm, the circumferential grooves 4 and 5 have a greater width, of 13 mm, and depth of 8.8 mm, and the circumferential groove 6 has an intermediate width, of 11 mm, and depth of 8.2 mm.

The row of blocks 9 includes a series of blocks 13, the row of blocks 10 includes a series of blocks 14, and the row of blocks 11 includes a series of blocks 15. The blocks 13, 14 and 15 have the shape of a shark's fin or sickle.

Each block 13 is delimited by a circumferential groove section (base of the block) 103 and coupled transverse grooves 16 and 18. The coupled transverse grooves 16 and 18 extend from ends of the circumferential groove section 103 and converge at a common vertex 19, namely meet at a common point. The common vertex 19 of the coupled grooves 16 and 18 is spaced from the closest circumferential groove 4 by a continuous circumferential rib 20 of elastomeric material. Each transverse groove 18 is separated from each immediately following transverse groove 16 by means of a continuous tread portion 21 which extends from the circumferential groove 3 as far as the circumferential rib 20, forming a single body with the circumferential rib. Thus the continuous portion of tread 21 separates two immediately consecutive blocks 13. In each row of blocks the distance between corresponding points of two immediately consecutive blocks 13, measured along the base of the blocks, forms the pitch of the row.

The common vertices 19 of all the coupled transverse grooves 16 and 18 have the same orientation in the longitudinal direction. Namely, the blocks 13 of the row 9 have cusps which have the same orientation in the longitudinal direction.

The transverse grooves 16 and 18 have an increasing width in the direction from the common vertex 19 towards the circumferential groove 3. The groove 16 has a minimum width of 1 mm, a maximum width of 6.1 mm and a depth increasing from 1 mm (vertex 19) to 8.7 mm. The groove 18 has a minimum width of 1 mm, a maximum width of 3.2 mm and a depth increasing from 1 mm (vertex 19) to 8.7 mm.

The grooves 16 and 18 have a curved shape and a respective median line 66 and 68 formed by an arc of a circle with a predefined radius of curvature. The median line 66 has a section 166 having a direction substantially parallel to the equatorial plane 7, a section 266 having a predefined inclination with respect to the circumferential groove 3, and a linking section 366 which joins together the sections 166 and 266. Typically, the radius of curvature of the median line of the grooves 18 is 1.5 times the radius of curvature of the median line of the grooves 16. In the specific case of the tread 2 (FIG. 3), the radius of curvature of the median line 66 of the grooves 16 is 70 mm and the radius of curvature of the median line 68 of the grooves 18 is 105 mm.

Each block 14 is delimited by a circumferential groove section 105 and by respective coupled transverse grooves 26 and 28 having the same shape as the grooves 16 and 18. The groove 26 has a minimum width of 1 mm, a maximum width of 7.6 mm and a depth increasing from 1 mm (vertex 29) to 8.7 mm. The groove 28 has a minimum width of 1 mm, a maximum width of 4 mm and depth increasing from 1 mm (vertex 29) to 8.7 mm. The coupled transverse grooves 26 and 28 converge at a common vertex 29 which is spaced from the closest circumferential groove 4 by a continuous circumferential rib 24 of elastomeric material. Each transverse groove 26 is separated from each immediately following transverse groove 28 by a continuous tread portion 25 which extends from the circumferential groove 5 as far as the circumferential rib 24, forming a single body with the circumferential rib.

The common vertices 29 of all the coupled transverse grooves 26 and 28 have the same orientation in the longitudinal direction and an orientation opposite to that of the common vertices 19 of the coupled transverse grooves 16 and 18. Namely, the blocks 14 have cusps which have an orientation opposite to that of the cusps of the blocks 13.

Each block 15 is delimited by a circumferential groove section 106 and by respective coupled transverse grooves 36 and 38 having the same shape and the same dimensions as the grooves 26 and 28. The coupled transverse grooves 36 and 38 converge at a common vertex 39 spaced from the closest circumferential groove 5 by a continuous circumferential rib 30 of elastomeric material. Each transverse groove 36 is separated from each immediately following transverse groove 38 by a continuous tread portion 31 which extends from the circumferential groove 6 as far as the circumferential rib 30, forming a single body with the circumferential rib.

The common vertices 39 of all the coupled transverse grooves 36 and 38 have the same orientation in the longitudinal direction. Their orientation is the same as that of the common vertices 29 of the coupled transverse grooves 26 and 28 and opposite to that of the common vertices 19 of the coupled transverse grooves 16 and 18.

The pattern of the rows of blocks 10 and 11 is obtained from that of the row of blocks 9 by rotating said row of blocks 9 through 180° about the equatorial plane of the tyre.

The transverse grooves 16 and 18 of the row of blocks 9 have a respective extension 41 and 42 which extends beyond the circumferential groove 3 into the axially internal shoulder region 108. The axially external shoulder region 208 has pairs of transverse grooves 43 and 44 which converge at a common vertex 45. The transverse grooves 43 and 44 are located between the extensions 41 and 42 and are spaced from the circumferential groove 3 by means of continuous portions 46 of elastomeric material.

The transverse grooves 36 and 38 of the row of blocks 11 have a respective extension 51 and 52 which extends beyond the circumferential groove 6 into the axially internal shoulder region 112. The axially external shoulder region 212 has pairs of transverse grooves 53 and 54 which extend from the circumferential groove 6 and converge at a common vertex 55. The transverse grooves 53 and 54 are located in between the extensions 51 and 52.

The common vertices 45 of the pairs of transverse grooves 43 and 44 have the same orientation in the longitudinal direction. Their orientation is the same as that of the common vertices 19. The common vertices 55 of the pairs of transverse grooves 53 and 54 have the same orientation in the longitudinal direction. Their orientation is the same as that of the common vertices 29 and 39 and opposite to that of the common vertices 45.

In the tread 2, the shoulder 8 has a void/solid ratio which is smaller than that of the shoulder 12. Said shoulder is located on the outer side of the motor car when the tyre 1 is fitted to the car, whereas the shoulder 12 is located on the inner side.

The tread 2 (FIG. 3) has a void/solid ratio=0.23 in the shoulder 8; a void/solid ratio=0.23 in the circumferential row of blocks 9; a void/solid ratio=0.28 in the circumferential row of blocks 10; a void/solid ratio=0.28 in the circumferential row of blocks 11; and a void/solid ratio=0.28 in the shoulder 12.

The tread 2 has a pattern of a the asymmetrical type, namely it operates in a more efficient manner when the tyre is mounted on the motor car with a given orientation instead of with the opposite one. In other words, the tyre preferentially has an inner side (vehicle side) and an outer side. In the tread 2, this is obtained by means of the different void/solid ratio on the two sides: smaller on the outer side and greater on the inner side. The low void/solid ratio on the outer side favours the handling of the motor car on a dry road surface, especially if it is a high-performance motor car in which greater camber angles are used, thereby making the footprint of the tyre (tread) asymmetrical.

Figure 3:
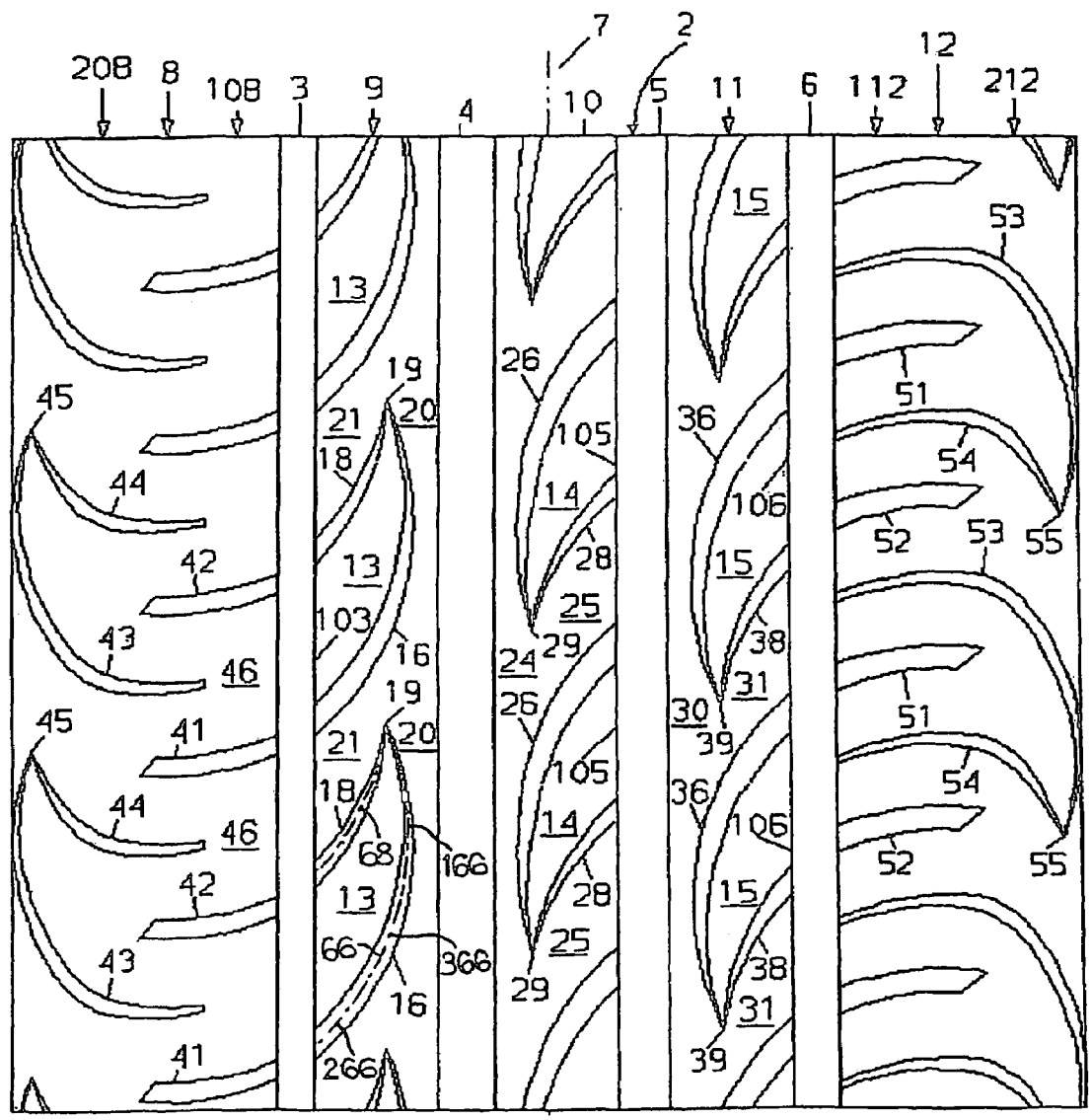
FIG. 3 is a plan view, on a larger scale, of the tyre tread according to FIG. 1.
Figure 4:
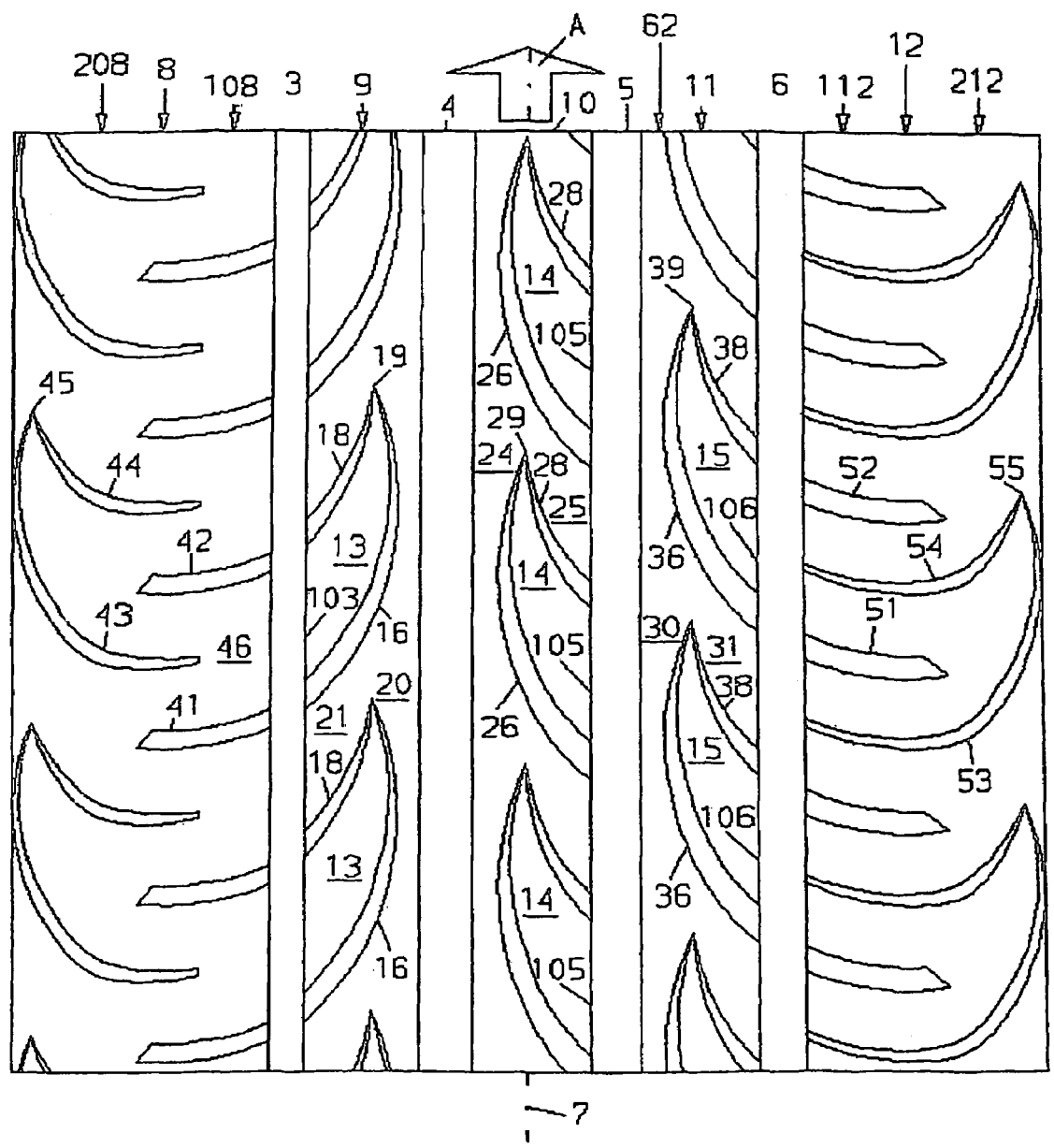
FIG. 4 is a plan view of a variant of the tread according to FIG. 3.

FIG. 4 shows a tread 62 which is a variant of that shown in FIG. 3 and in which identical parts are indicated by the same numbers. The tread 62 is of the asymmetrical directional type, namely has an orientation in the longitudinal direction which indicates the direction of travel (arrow A). In the tread 62, the common vertices 19, 29 and 39 of the coupled transverse grooves 16 and 18, 26 and 28, 36 and 38, respectively, have the same orientation in the longitudinal direction. Also the common vertices 45 and 55 have the same orientation of the common vertices 19, 29 and 39.

In the tread 62, the shoulder 8 is located on the outer side when the tyre 1 is mounted on the motor car.

Figure 5:
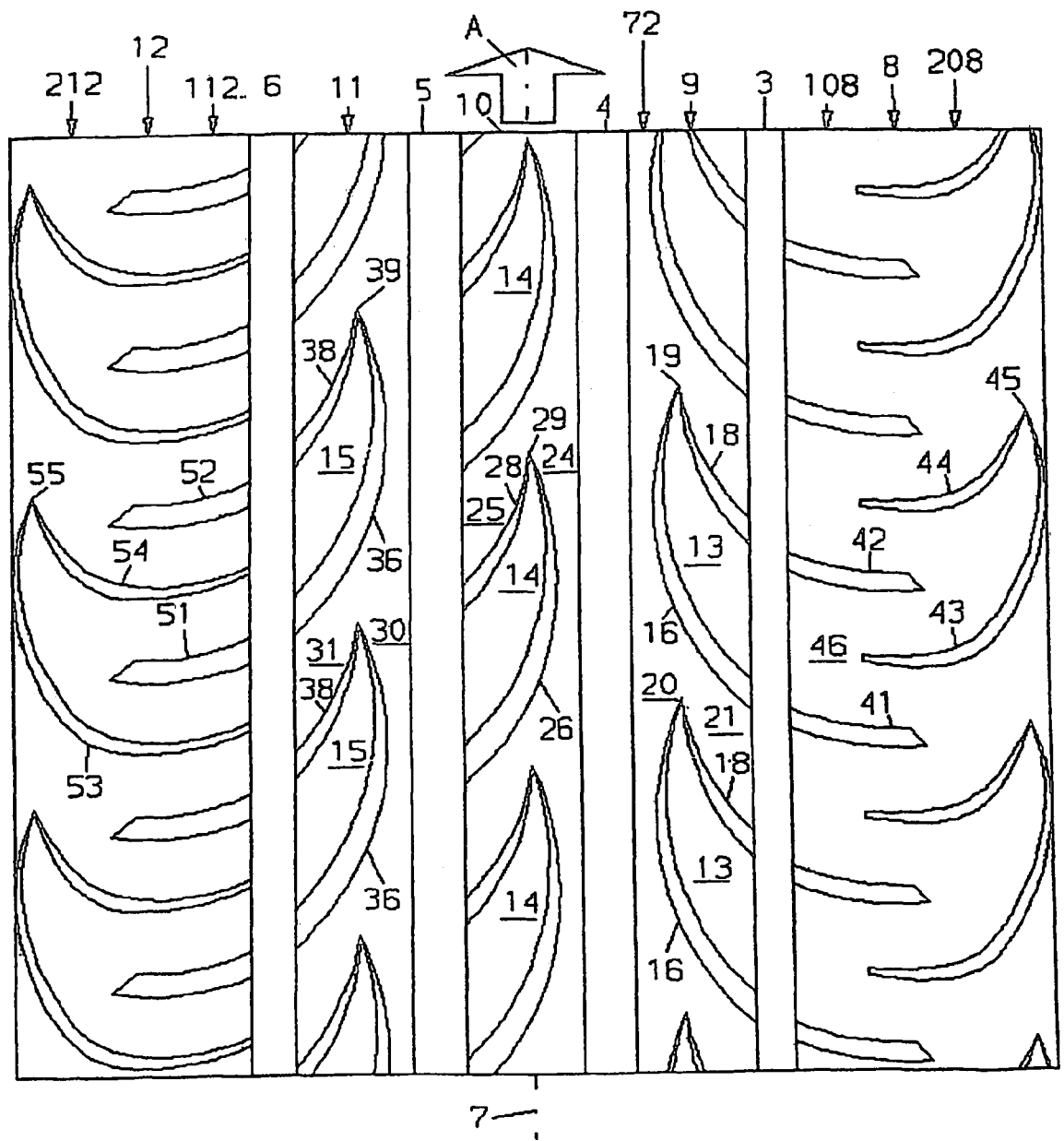
FIG. 5 is a plan view of another variant of the tread according to FIG. 3.

FIG. 5 shows a tread 72 which is a variant of that shown in FIG. 3 and in which identical parts are indicated by the same numbers. The pattern of the tread 72 is a mirror image of that of the tread 62 and is also of the asymmetrical directional type.

Figure 6:
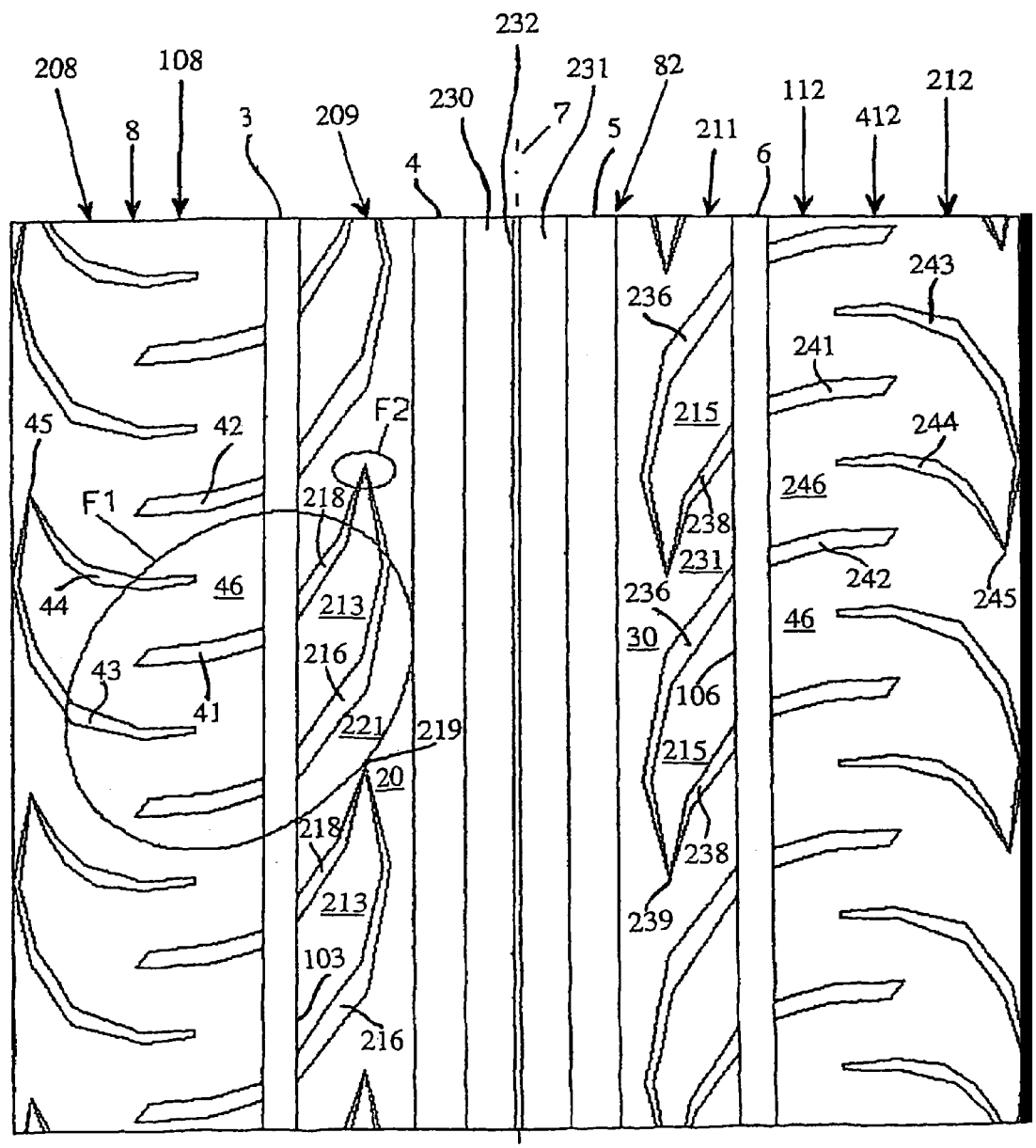
FIG. 6 is a plan view of a further variant of the tread according to FIG. 3.

FIG. 6 shows a tread 82 which is a variant of that shown in FIG. 3 and in which identical parts are indicated by the same numbers. The tread 82 is of the asymmetrical type and includes shoulders 8 and 412, a circumferential row of blocks 209, located between the circumferential grooves 3 and 4, a circumferential row of blocks 211, located between the circumferential grooves 5 and 6, and two central circumferential ribs 230 and 231 separated by a middle circumferential groove 232.

The middle circumferential groove 232 has a width which ranges from 1.5 to 3 mm and a depth which ranges from 1 to 4 mm. For example, it has a width of 1.5 mm and a depth of 2 mm.

The row of blocks 209 comprises a series of blocks 213, each of which is delimited by the circumferential groove section 103 and by two coupled transverse grooves 216 and 218. The coupled transverse grooves 216 and 218 extend from the ends of the circumferential groove section 103 and converge at a common vertex 219 which is spaced from the closest circumferential groove 4 by the continuous circumferential rib 20 of elastomeric material. Each transverse groove 218 is separated from each immediately following transverse groove 216 by means of a continuous tread portion 221 which extends from the circumferential groove 3 as far as the circumferential rib 20, forming a single body with the circumferential rib.

The row of blocks 211 comprises a series of blocks 215, each of which is delimited by the circumferential groove section 106 and by two coupled transverse grooves 236 and 238. The coupled transverse grooves 236 and 238 extend from the ends of the circumferential groove section 106 and converge at a common vertex 239 which is spaced from the closest circumferential groove 5 by the continuous circumferential rib 30 of elastomeric material.

Each transverse groove 238 is separated from each immediately following transverse groove 236 by means of a continuous tread portion 231 which extends from the circumferential groove 6 as far as the circumferential rib 30, forming a single body with the circumferential bead.

The coupled transverse grooves 216 and 218, and 236 and 238 comprise sections substantially parallel to the circumferential grooves and sections inclined with respect to the circumferential grooves. The grooves 216, 218, 236 and 238 have a width increasing in the direction from the vertex 219 or 239 towards the circumferential groove 3 or 6.

The shoulder 412 has, in the axially internal zone 112, extensions 241 and 242 of the transverse grooves 236 and 238 and, in the axially external zone 212, pairs of transverse grooves 243 and 244 which converge at a common vertex 245. The transverse grooves 243 and 244 are located in between the extensions 241 and 242 and are spaced from the circumferential groove 6 by means of continuous portions 246 of elastomeric material.

The pattern of the shoulder 412 is obtained from that of the shoulder 8 by rotating said pattern through 180° with respect to the equatorial plane of the tyre.

FIG. 6 indicates by means of an elliptical line F1, the part of the tread pattern which produces a disturbance having a frequency proportional to the total number of the transverse grooves which undergo an impact in the footprint area. In the area delimited by the elliptical line F2, the disturbance produced by the pattern is equal to half the total number of the abovementioned transverse grooves since they meet in pairs at the same vertex. A further advantage in terms of low noise level consists in the fact that said pairs of grooves become blind at the common vertex of convergence, i.e. they meet in a solid portion of the tread and not in an open space such as, for example, an additional groove.

The structure of the tyre 1 is per se of the conventional type and comprises a carcass, a tread band located on the crown of the carcass, a pair of axially facing sidewalls terminating in beads reinforced with bead cores and associated bead fillings. The tyre also preferably comprises a belt structure located between carcass and tread band. The carcass is reinforced with one or more carcass plies which are secured to the bead cores, while the belt structure comprises two belt strips which are arranged radially on top of each other. The belt strips are formed by portions of rubberised fabric incorporating metal cords which are parallel to each other in each strip and intersect with those of the adjacent strips, being inclined preferably in a symmetrical manner with respect to the equatorial plane. Preferably, the belt structure also comprises a third belt strip, in a radially outermost position, provided with cords which are oriented circumferentially, i.e. at zero degrees with respect to said equatorial plane. The cords of the zero degree belt are preferably made of textiles or even more preferably of heat-shrinkable material. The tyre 1 has a ratio H/C of the height of the right cross-section to the maximum width of the section, ranging between 0.65 and 0.20.

Preferably, the tyre 1 is of the type which has a very low cross-section with a ratio H/C of between 0.45 and 0.25.

Figure 7:
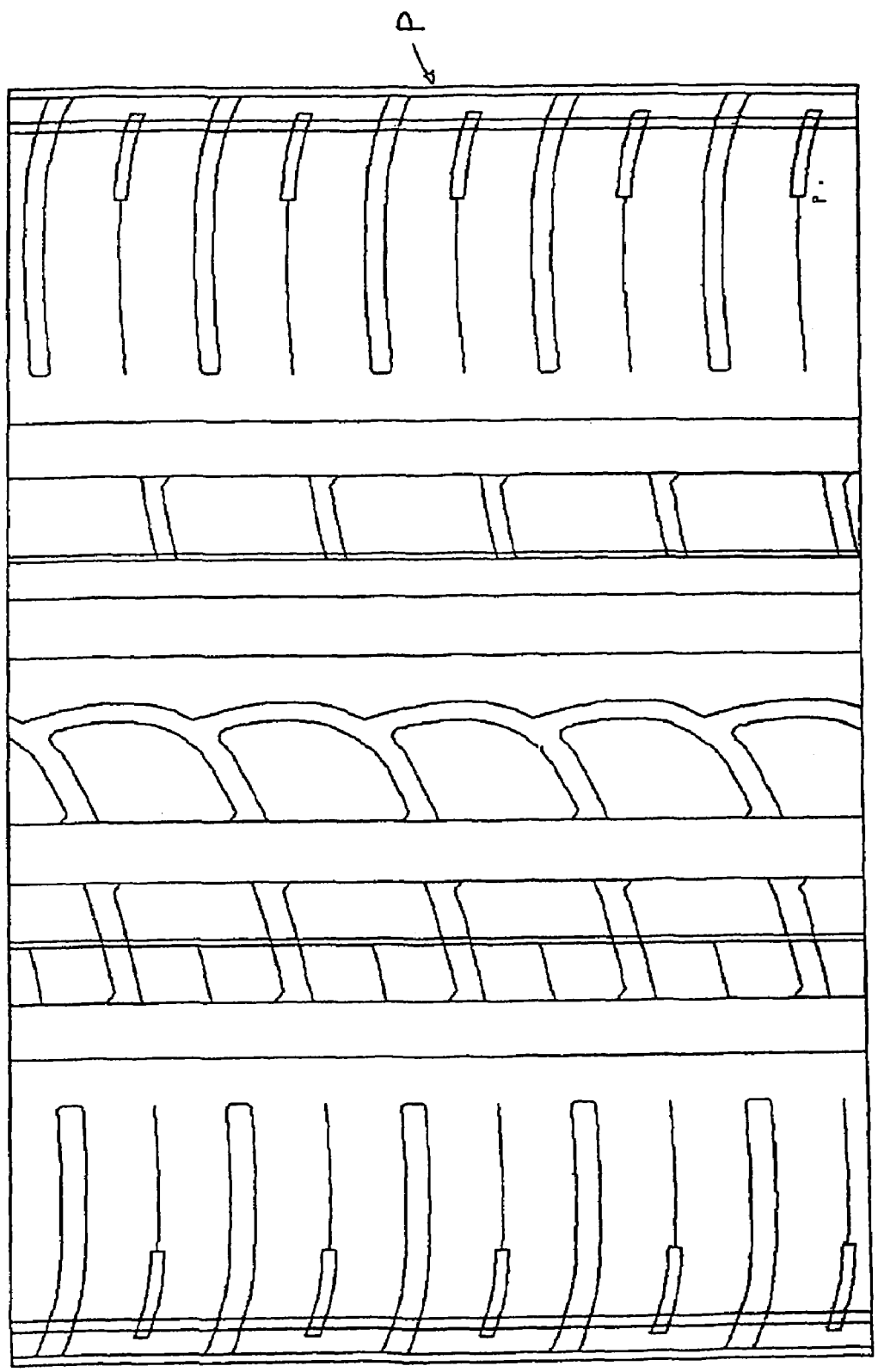
FIG. 7 is a plan view of the tread of a comparative tyre.

An example of the tyre according to the invention, having the tread 2 according to FIGS. 1-3, was constructed and was subjected to comparative tests with a tyre P shown in FIG. 7.

The comparative tyre P was chosen because it has excellent characteristics and has been type-approved for fast and very high-performance sports cars.

The tyre according to the invention had a size of 225/40 R18, with wheel rim of 7.5×18 and inflation pressure of 2.2 bar. The comparative tyre had the same measurements.

A car, model BMW 328 I, was first equipped with four tyres according to the invention and then with four comparative tyres.

Aquaplaning tests were carried out along straight road sections and around bends, together with braking tests on dry and wet road surfaces, handling tests on dry and wet road surfaces, tests for noise inside and outside the car, and comfort tests.

The aquaplaning test along the straight was carried out along a straight section of smooth asphalt, of predefined length (100 m), with a layer of water of predefined constant height (7 mm) which was automatically restored after each test vehicle had passed by. The vehicle entered at a constant speed (approximately 70 km/h) in conditions of perfect grip and accelerated until the conditions of total loss of grip occurred.

The aquaplaning test around bends was carried out along a road section with smooth and dry asphalt, around a bend with a constant radius (100 m), having a predefined length and comprising, along a final section; a zone of predefined length (20 m) flooded with a layer of water of predefined thickness (6 mm). The test was carried out at a constant speed for different speed values.

During the course of the test, the maximum centrifugal acceleration and the maximum speed of the car corresponding to complete aquaplaning were recorded.

The braking test was carried out along a straight section of asphalt both in dry and wet conditions, recording the stopping distance from a predefined initial speed, typically 100 km/h in dry conditions and 80 km/h in wet conditions. The stopping distance is determined as the mathematical average of a series of successive recorded values.

The handling test, in dry and wet surface conditions, was carried out along predefined sections, typically of circuits closed to traffic. By means of the simulation of certain characteristic manoeuvres (such as change of lane, overtaking, slalom between skittles, entering and leaving a bend) carried out at constant speed, as well as during acceleration and deceleration, the performance of the tyre was assessed by the test driver by assigning a numerical evaluation for the tyre behaviour during the abovementioned manoeuvres.

The evaluation scale represents a subjective opinion expressed by the test driver during tests carried out in sequence on the equipment being compared.

The noise tests were carried out both indoors and outdoors.

The indoor tests were carried out in an externally soundproofed chamber (semianechoic chamber) by using the abovementioned motor car equipped first with a tyre according to the invention and then with a comparative tyre, keeping the tyre in contact with a rotating drum made to rotate at different speeds. Microphones were arranged inside and outside the car in order to measure, respectively, the internal noise and external noise.

The outdoor test was carried out along a straight section equipped with microphones. The car entered the section at a predefined speed of entry, after which the engine was switched off and the noise outside the car in neutral gear was measured.

The comfort was evaluated in terms of the overall sensations perceived by the test driver compared to the capacity for the tyre to absorb the roughness of the road surface.

The noise and comfort tests were carried out in the conditions prescribed by the standard RE01.

The results of the tests are shown in Table I where the values assigned are expressed as a percentage against the values of the comparative tyre fixed at 100.

TABLE I

|  | Comparative tire | Tire according to the invention |
| --- | --- | --- |
| Aquaplaning along straight sections | 100 | 105 |
| Aquaplaning around bends | 100 | 110 |
| Braking on dry surface | 100 | 103 |
| Braking on wet surface | 100 | 107 |
| Handling on dry surface | 100 | 100 |
| Handling on wet surface | 100 | 105 |
| Internal noise | 100 | 100 |
| External noise* | 100 | 110 |
| Comfort | 100 | 100 |

*Values recorded during outdoor tests

In Table I, the values greater than 100 indicate an improvement with respect to the comparative tyre.

The results of the tests show that the tyre according to the invention has a behaviour which is markedly better than that of the comparative tyre in the tests carried out for braking on wet surfaces and external noise.

Figure 8:
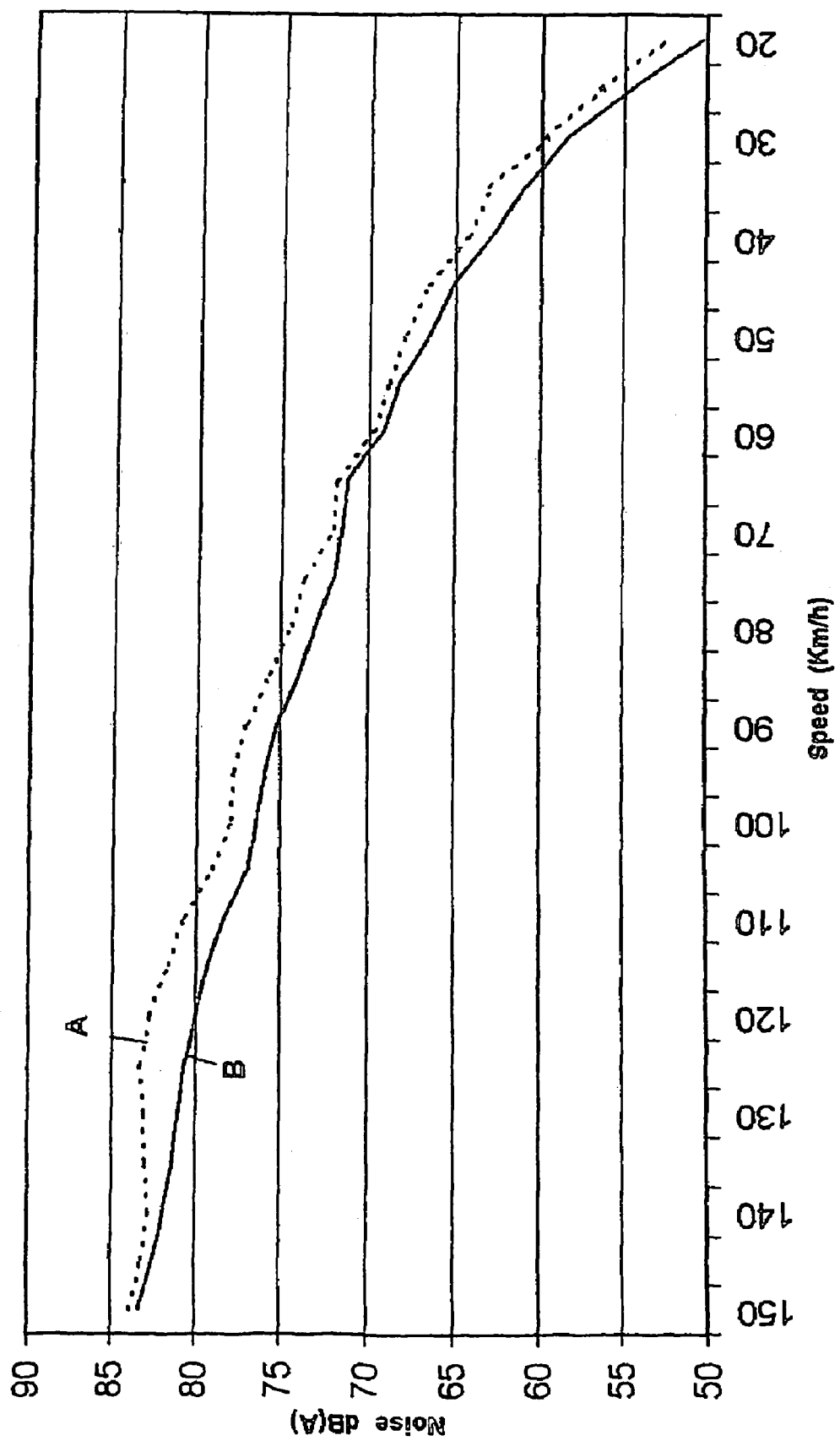
Figure 9:
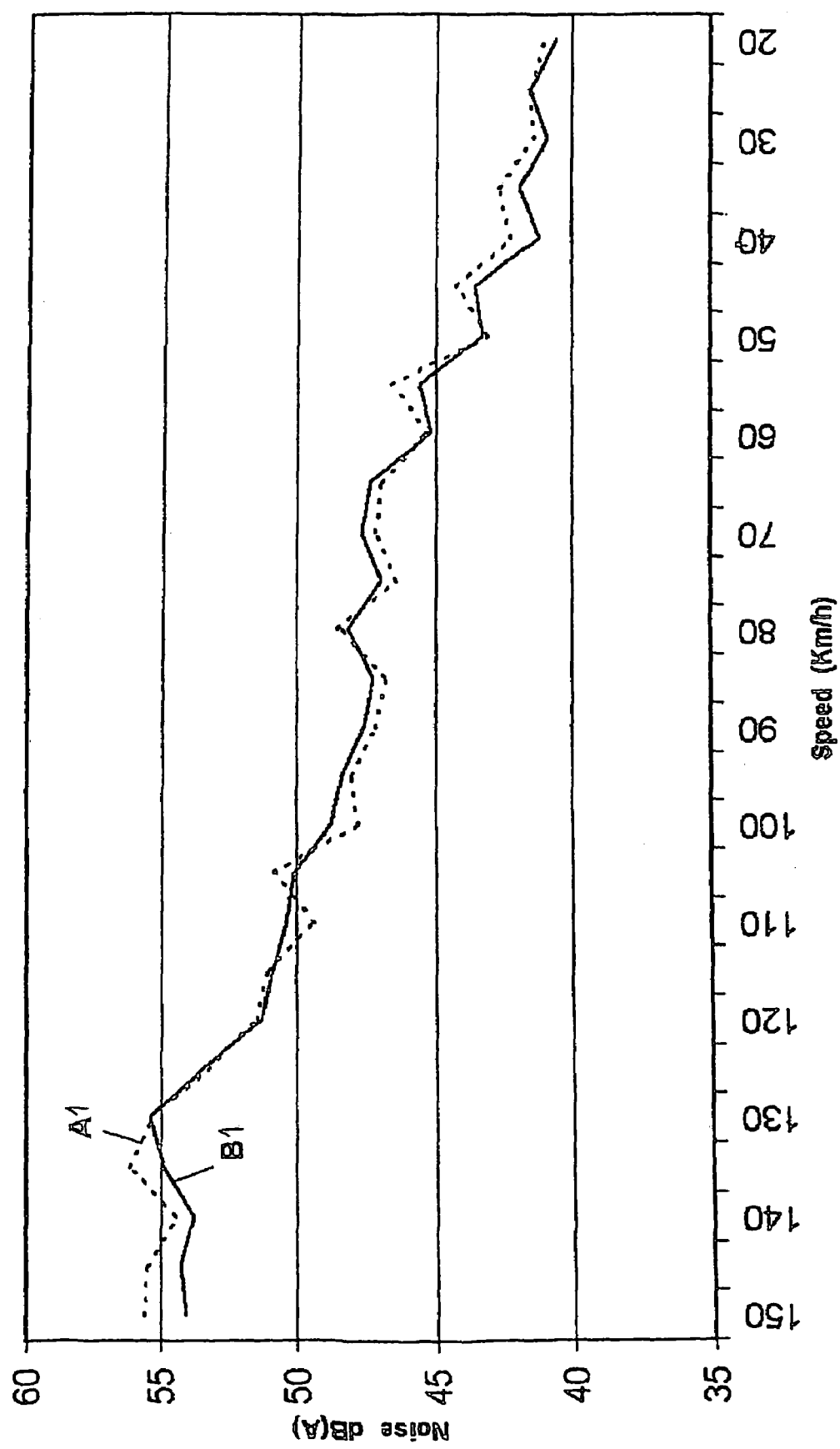

FIGS. 8, and 9 show the graphs relating to the noise level in dB(A) outside (FIG. 8) and inside (FIG. 9) the car in relation to the speed (km/h) ranging from 150 to 20 km/h. The graphs A and A1 relate to the comparative tyre, while the graphs B and B1 relate to the tyre according to the invention. It may be noted that the tyre according to the invention has an external noise level which is lower than that of the comparative tyre by on average 1.5 dB(A), while the internal noise level is substantially equivalent to that of the comparative tyre.

FIGS. 10, 11 12 and 13 are three-dimensional graphs which show the progression of the sound pressure (Pa) of the phonometric signal in relation to the speed (km/h) and the frequency (Hz).

Figure 10:
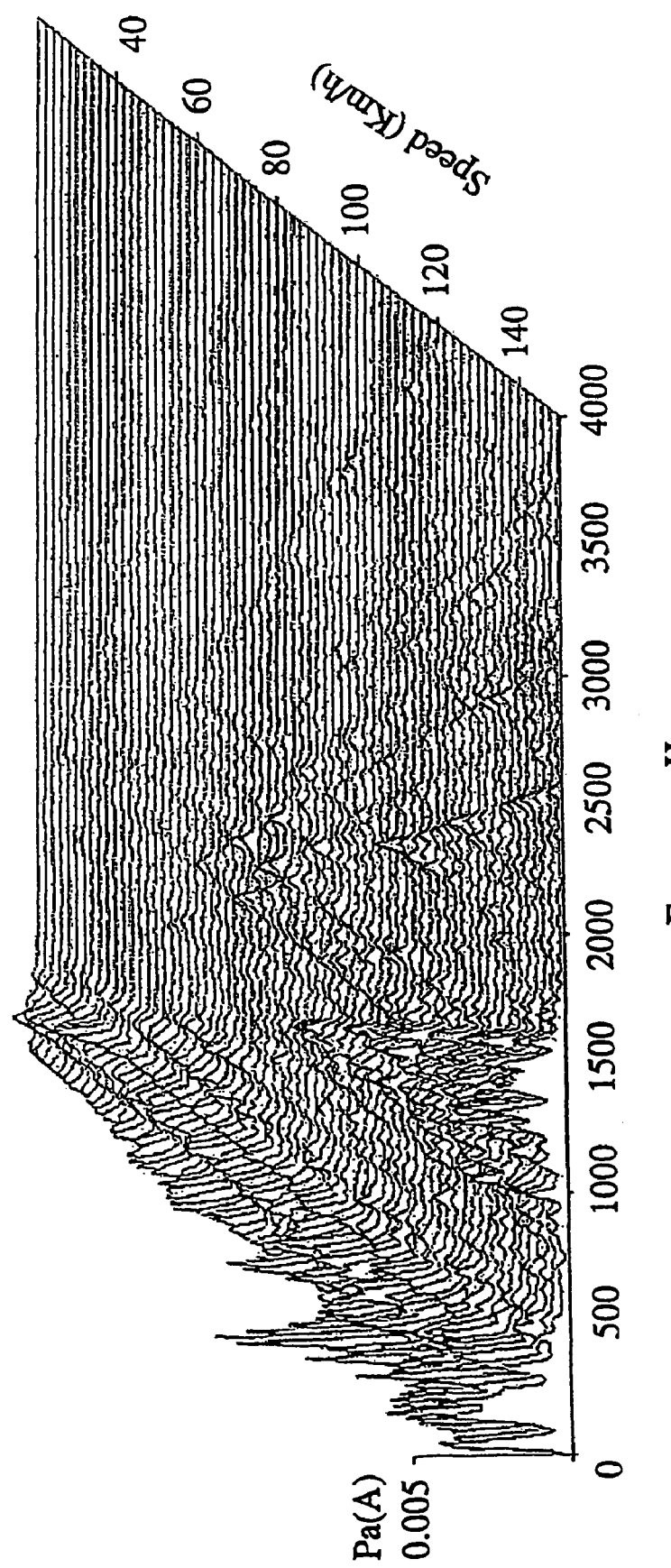
Figure 12:
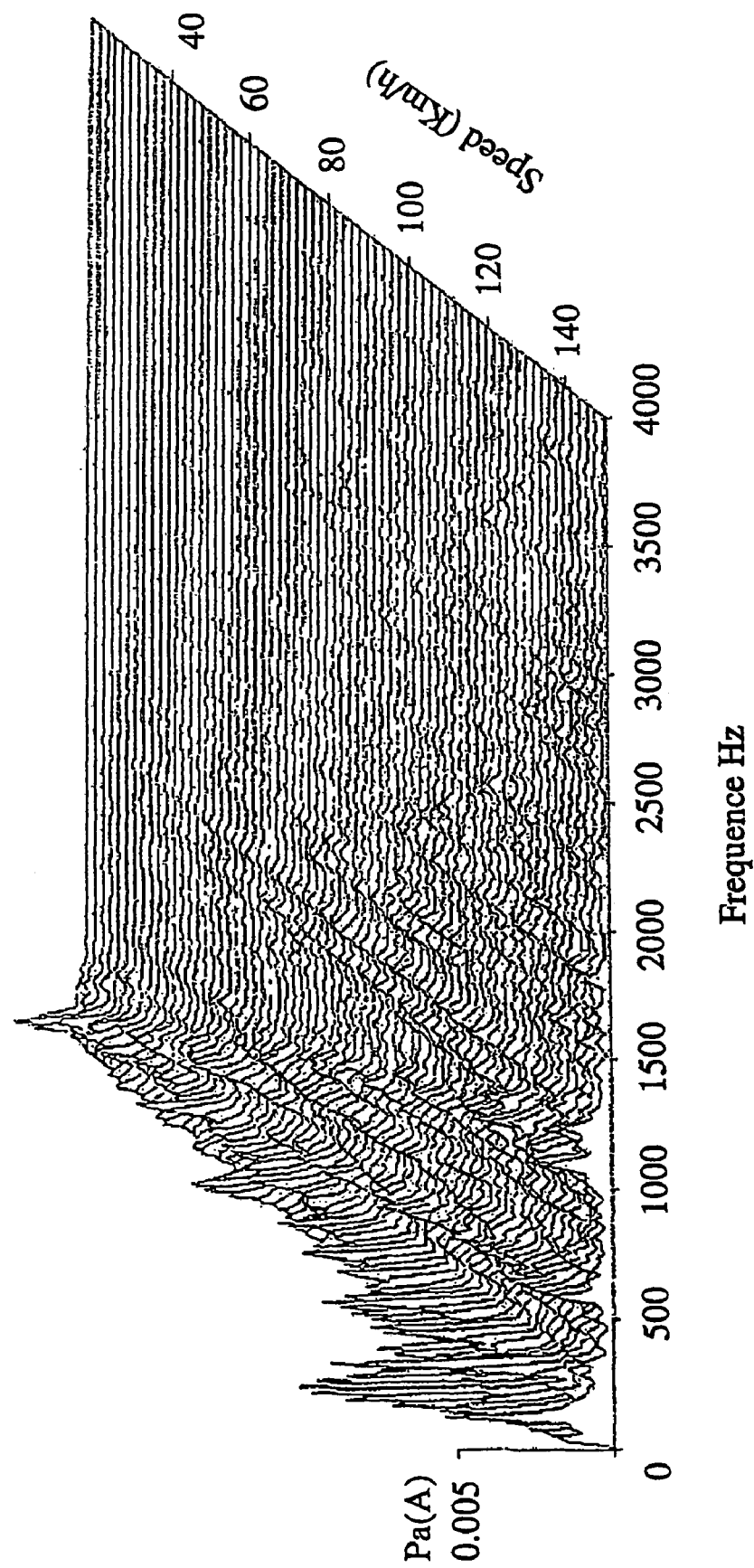

FIG. 10 refers to the internal noise of the motor car equipped with the comparative tyres. FIG. 12 refers to the noise inside the motor vehicle equipped with the comparative tyres.

As can be seen from the graphs, the tyre according to the invention has a noise distribution in three different frequency ranges: the low frequency range (0-300 Hz), the range of frequencies characteristic of the pitch of the tyre (800-1600 Hz) and a further middle frequency range (300-800 Hz).

The comparative tyre, although producing on average a low-intensity noise level, concentrates all the disturbance in the low and high frequencies.

The tyre according to the invention, on the contrary, by distributing more uniformly the noise over the whole frequency range, produces a noise which is perceived in a more attenuated manner.

Figure 11:
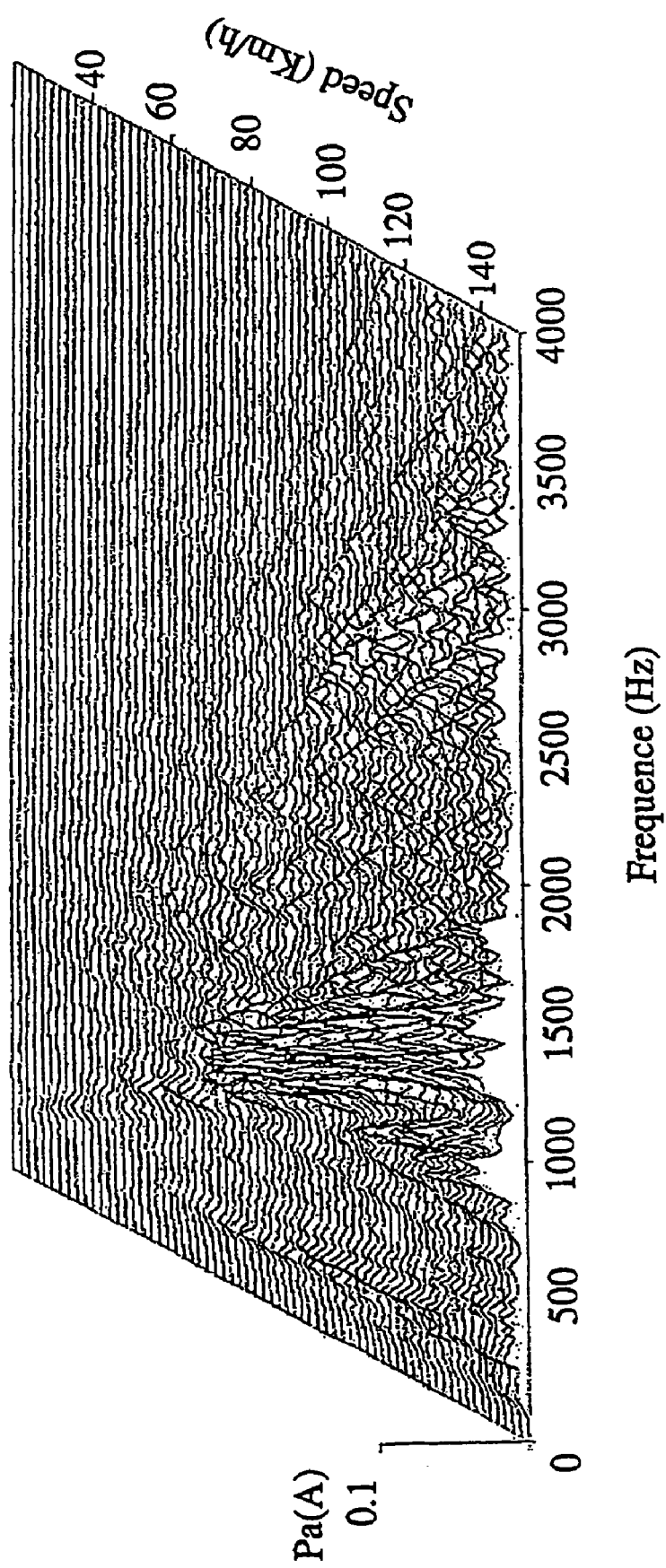
Figure 13:
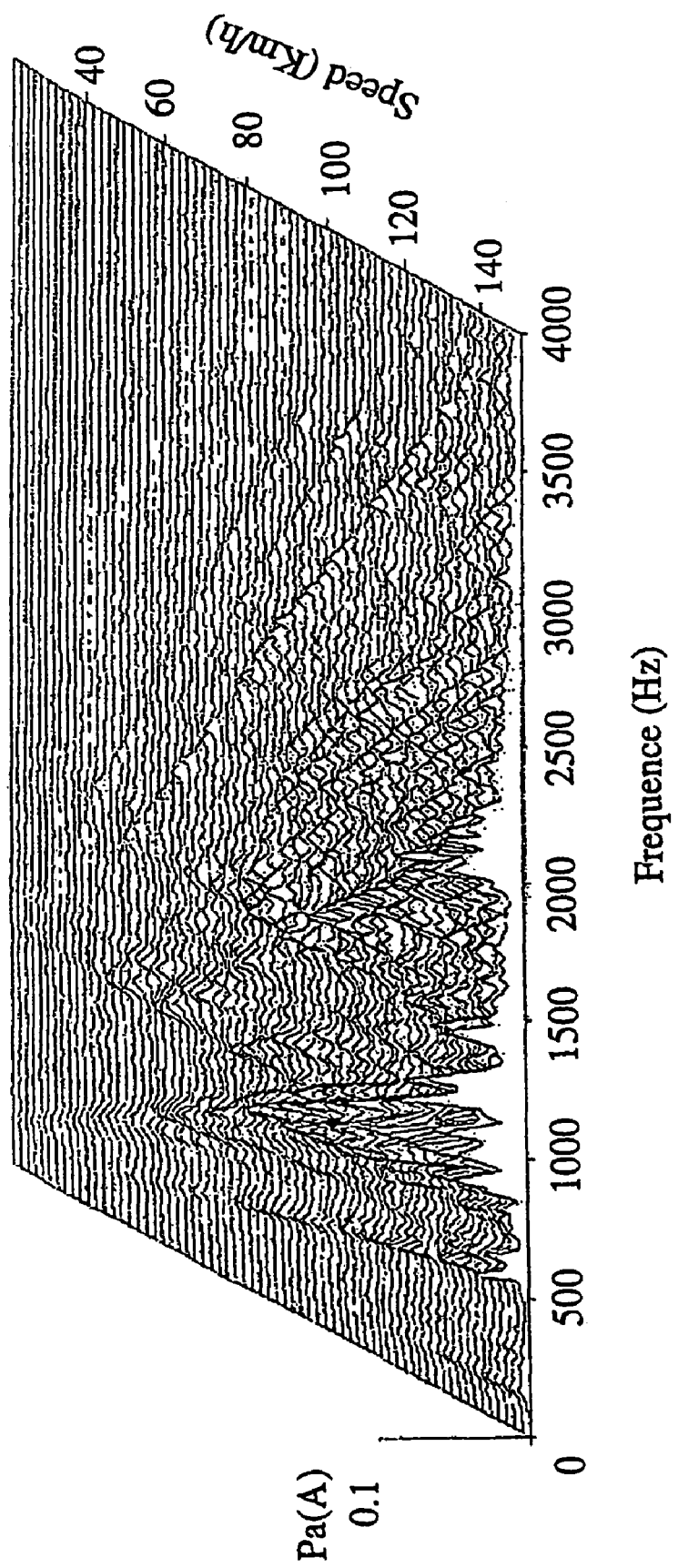

FIG. 11 refers to the noise outside the motor car equipped with the tyres according to the invention. FIG. 13 refers to the noise outside the car equipped with the tyres according to the invention.

Unlike the graphs relating to the internal noise, those relating to the external noise do not have the low-frequency range characteristic of the transmission of the noise "via solid" (through the car). On the other hand, the noise generated in the medium and high frequency range which extends up to 2500 Hz (transmission "via air") is emphasized. The tyre according to the invention also produces in this case a distribution of the noise over a wider frequency band, attenuating the average intensity thereof.

FIG. 14 shows the graphs for the intensity of the external noise dB(A) in relation to the speed (km/h) for the tyre according to the invention (graph B2) and for the comparative tyre (graph A2).

The graphs show the result of so-called "coast-by-noise" tests (ISO 362-1981, Amendment 1, published 1985) carried out with the motor car described above on the track of Vizzola Ticino in accordance with the standard ISO 10844. As is known, during these tests the reference speed is 80 km/h.

The graphs according to FIG. 14 show that the tyre according to the invention has proved to be less noisy than the comparative tyre by 2 dB(A).

The invention claimed is:

1. A tyre for a motor vehicle, comprising:
a tread, the tread defining a longitudinal direction and a lateral direction transverse to the longitudinal direction; and
two shoulders;
wherein the tread comprises:
a first circumferential row of blocks disposed between first and second circumferential grooves,
wherein each of the blocks is delimited by a section of the first circumferential groove and by first and second transverse grooves that extend from the first circumferential groove and terminate at a first common vertex spaced from the second circumferential groove,
wherein the second transverse groove delimits a first one of the blocks and is separated from the first transverse groove that delimits a circumferentially adjacent block by a solid tread portion,
wherein the first common vertex is separated from the second circumferential groove by a continuous circumferential tread rib,
wherein the solid tread portion extends from the first circumferential groove to the continuous circumferential tread rib, and
wherein the solid tread portion forms a single body with the continuous circumferential tread rib, spacing the first block and the circumferentially adjacent block from each other; and
a second circumferential row of blocks disposed between the second circumferential groove and a third circumferential groove,
wherein each of the blocks of the second circumferential row of blocks is delimited by a section of the second circumferential groove and by third and fourth transverse grooves that extend from the second circumferential groove and converge and terminate at a second common vertex,
wherein at least one of the first and second transverse grooves comprises an increasing width in a direction from the first common vertex toward the first circumferential groove, and
wherein the first and second transverse grooves and the third and fourth transverse grooves extend from the respective first and second circumferential grooves in the same lateral direction of the tread.

2. The tyre of claim 1, wherein at least one of the first and second transverse grooves further comprises:
a first section comprising a direction substantially parallel to an equatorial plane of the tyre;
a second section comprising a predefined inclination with respect to the first circumferential groove; and
a linking section joining together the first and second sections.

3. The tyre of claim 1, wherein the first and second transverse grooves of the first row of blocks extend beyond the first circumferential groove and into an axially internal region of one of the shoulders.

4. The tyre of claim 1, wherein at least one of the shoulders comprises, in a laterally external region, pairs of additional transverse grooves converging toward a third common vertex.

5. The tyre of claim 4, wherein the additional transverse grooves are separated from the first circumferential groove by solid portions of elastomeric material.

6. The tyre of claim 5, wherein a laterally internal region of a first shoulder comprises a void/solid ratio smaller than that of a laterally internal region of a second shoulder, and
wherein the first shoulder is positioned on an outer side of the motor vehicle when the tyre is mounted on the motor vehicle.

7. The tyre of claim 4, wherein the additional transverse grooves extend from the first circumferential groove.

8. The tyre of claim 7, wherein a laterally internal region of a first shoulder comprises a void/solid ratio smaller than that of a laterally internal region of a second shoulder, and
wherein the first shoulder is positioned on an outer side of the motor vehicle when the tyre is mounted on the motor vehicle.

9. A tyre for a motor car, comprising:
a tread; and
two shoulders;
wherein the tread comprises:
a circumferential row of blocks disposed between first and second circumferential grooves;

wherein each of the blocks is delimited by a section of the first circumferential groove and by first and second transverse grooves that extend from the first circumferential groove and terminate at a common vertex spaced from the second circumferential groove, wherein the first and second transverse grooves of the circumferential row of blocks are oriented in a first direction along a longitudinal direction of the tread, wherein the common vertex is separated from the second circumferential groove by a continuous circumferential tread rib, wherein the second transverse groove delimits a first one of the blocks and is separated from the first transverse groove that delimits a circumferentially adjacent block by a solid tread portion, wherein at least one of the first and second transverse grooves comprises an increasing width in a direction from the common vertex toward the first circumferential groove, wherein the solid tread portion extends from the first circumferential groove to the continuous circumferential tread rib, wherein the solid tread portion forms a single body with the continuous circumferential tread rib, spacing the first block and the circumferentially adjacent block from each other, and wherein the circumferential row of blocks is a first central circumferential row of blocks, the tread further comprising:

first and second lateral circumferential rows of blocks, wherein the continuous circumferential tread rib is a first continuous circumferential tread rib and the common vertex is a first common vertex, wherein second common vertices of first and second transverse grooves of the first lateral circumferential row of blocks have a first orientation wherein each block of the first lateral circumferential row of blocks is delimited by a section of a third circumferential groove and by first and second transverse grooves that extend from the third circumferential groove and terminate at a second common vertex spaced from the second circumferential groove, wherein the first and second transverse grooves of the first lateral circumferential row of blocks are oriented in the opposite direction of said first direction along the longitudinal direction of the tread, wherein the second common vertex is separated from the second circumferential groove by a second continuous circumferential tread rib; and third common vertices of first and second transverse grooves of the second lateral circumferential row of blocks have a second orientation wherein each block of the second lateral circumferential row of blocks is delimited by a section of a fourth circumferential groove and by first and second transverse grooves that extend from the fourth circumferential groove and terminate at a third common vertex spaced from the first circumferential groove, wherein the first and second transverse grooves of the second lateral circumferential row of blocks are oriented in said first direction along the longitudinal direction of the tread, and wherein the third common vertex is separated from the first circumferential groove by a third continuous circumferential tread rib.

10. A tyre for a motor car, comprising:
a tread; and
two shoulders;
wherein the tread comprises:

a circumferential row of blocks disposed between first and second circumferential grooves;

wherein each of the blocks is delimited by a section of the first circumferential groove and by first and second transverse grooves that extend from the first circumferential groove and terminate at a common vertex spaced from the second circumferential groove, wherein the first and second transverse grooves of the circumferential row of blocks are oriented in a first direction along a longitudinal direction of the tread, wherein the common vertex is separated from the second circumferential groove by a continuous circumferential tread rib, wherein the second transverse groove delimits a first one of the blocks and is separated from the first transverse groove that delimits a circumferentially adjacent block by a solid tread portion, wherein at least one of the first and second transverse grooves comprises an increasing width in a direction from the common vertex toward the first circumferential groove, wherein the solid tread portion extends from the first circumferential groove to the continuous circumferential tread rib, wherein the solid tread portion forms a single body with the continuous circumferential tread rib, spacing the first block and the circumferentially adjacent block from each other, and wherein the circumferential row of blocks is a first central circumferential row of blocks, the tread further comprising:

first and second lateral circumferential rows of blocks, wherein the continuous circumferential tread rib is a first continuous circumferential tread rib and the common vertex is a first common vertex, wherein second common vertices of the first and second transverse grooves of the first lateral circumferential row of blocks have a first orientation wherein each block of the first lateral circumferential row of blocks is delimited by a section of a third circumferential groove and by first and second transverse grooves that extend from the third circumferential groove and terminate at a second common vertex, wherein the first and second transverse grooves of the first lateral circumferential row of blocks extend in said first direction along the longitudinal direction of the tread, and wherein the second common vertex is separated from the first circumferential groove by a second continuous circumferential tread rib; and third common vertices of first and second transverse grooves of the second lateral circumferential row of blocks have a second orientation wherein each block of the second lateral circumferential row of blocks is delimited by a section of a fourth circumferential groove and by first and second transverse grooves that extend from the fourth circumferential groove and terminate at a third common vertex spaced from the second circumferential groove, wherein the first and second transverse grooves of the second lateral circumferential row of blocks are oriented in said first direction along the longitudinal direction of the tread, and wherein the third common vertex is separated from the second circumferential groove by a third continuous circumferential tread rib.

11. A tyre for a motor car, comprising:
a tread; and
two shoulders;
wherein the tread comprises:
   a circumferential row of blocks disposed between first and second circumferential grooves;
   wherein each of the blocks is delimited by a section of the first circumferential groove and by first and second transverse grooves that extend from the first circumferential groove and terminate at a common vertex spaced from the second circumferential groove,
   wherein the first and second transverse grooves of the circumferential row of blocks are oriented in a first direction along a longitudinal direction of the tread,
   wherein the common vertex is separated from the second circumferential groove by a continuous circumferential tread rib,
   wherein the second transverse groove delimits a first one of the blocks and is separated from the first transverse groove that delimits a circumferentially adjacent block by a solid tread portion,
   wherein at least one of the first and second transverse grooves comprises an increasing width in a direction from the common vertex toward the first circumferential groove,
   wherein the solid tread portion extends from the first circumferential groove to the continuous circumferential tread rib,
wherein the solid tread portion forms a single body with the continuous circumferential tread rib, spacing the first block and the circumferentially adjacent block from each other, and
wherein the circumferential row of blocks is a first central circumferential row of blocks, the tread further comprising:
a second central circumferential row of blocks disposed between third and fourth circumferential grooves; and
first and second central circumferential ribs,
wherein the first central circumferential rib is separated from the first central circumferential row of blocks by the second circumferential groove,
wherein the first central circumferential rib is separated from the second central circumferential rib by a middle circumferential groove,
wherein the second central circumferential rib is separated from the second central circumferential row of blocks by the third circumferential groove.

12. The tyre of claim 11, wherein the continuous circumferential tread rib is a first continuous circumferential tread rib and the common vertex is a first common vertex,
   wherein second common vertices of the second central circumferential row of blocks have an orientation wherein each of the blocks is delimited by a section of the fourth circumferential groove and by first and second transverse grooves that extend from the fourth circumferential groove and terminate at a second common vertex spaced from the third circumferential groove,
   wherein the first and second transverse grooves of the second central circumferential row of blocks are oriented in the opposite direction of said first direction along the longitudinal direction of the tread, and
   wherein the second common vertex is separated from the third circumferential groove by a second continuous circumferential tread rib.

13. The tyre of claim 11, wherein the first and second transverse grooves of at least one of the first and second central circumferential rows of blocks extend beyond a respective first or fourth circumferential groove and into an axially internal region of one of the shoulders.

14. A tyre for a motor vehicle, comprising:
a tread, the tread defining a longitudinal direction and a lateral direction transverse to the longitudinal direction; and
two shoulders;
wherein the tread comprises:
   a first circumferential row of blocks disposed between first and second circumferential grooves;
   wherein each of the blocks of the first circumferential row of blocks is delimited by a section of the first circumferential groove and by first and second transverse grooves that extend from the first circumferential groove and converge and terminate at a first common vertex,
   wherein the second transverse groove delimits a first one of the blocks and is separated from the first transverse groove that delimits a circumferentially adjacent block by a solid tread portion,
   wherein the first common vertex is separated from the second circumferential groove by a continuous circumferential tread rib,
   wherein the solid tread portion extends from the first circumferential groove to the continuous circumferential tread rib, and
   wherein the solid tread portion forms a single body with the continuous circumferential tread rib, spacing the first block and the circumferentially adjacent block from each other; and
   a second circumferential row of blocks disposed between the second circumferential groove and a third circumferential groove,
   wherein each of the blocks of the second circumferential row of blocks is delimited by a section of the second circumferential groove and by third and fourth transverse grooves that extend from the second circumferential groove and converge and terminate at a second common vertex,
   wherein the first and second transverse grooves and the third and fourth transverse grooves extend from the respective first and second circumferential grooves in the same lateral direction of the tread, and
   wherein at least one of the first and second transverse grooves and at least one of the third and fourth transverse grooves define an increasing width in the direction from the respective first and second common vertices toward the respective first and second circumferential grooves.

15. The tyre of claim 14, wherein the tyre defines an equatorial plane, and one of the first and second circumferential rows of blocks is disposed either in the vicinity of the equatorial plane or co-extensive with the equatorial plane.

16. The tyre of claim 14, wherein the circumferential tread rib is a first circumferential tread rib, and wherein the second common vertex of the second circumferential row of blocks is laterally spaced from the third circumferential groove by a second circumferential tread rib.

17. The tyre of claim 16, wherein the second circumferential tread rib defines an edge of the third circumferential groove, and the tread further comprises a third circumferential tread rib spaced from the second circumferential tread rib by the third circumferential groove.

18. The tyre of claim 17, wherein the third circumferential tread rib comprises a plurality of arc-shaped transverse grooves.

19. The tyre of claim 18, wherein the plurality of arc-shaped transverse grooves define a third row of blocks.

20. The tyre of claim 14, wherein the first common vertex of each block of the first circumferential row of blocks and the second common vertex of each block of the second circumferential row of blocks extend in the same direction along the longitudinal direction of the tread.

21. A tyre for a motor vehicle, comprising:

a tread, the tread defining a longitudinal direction and a lateral direction transverse to the longitudinal direction; and two shoulders;

wherein the tread comprises:

a first circumferential row of blocks disposed between first and second circumferential grooves;

wherein each of the blocks of the first circumferential row of blocks is delimited by a section of the first circumferential groove and by first and second transverse grooves that extend from the first circumferential groove and converge and terminate at a first common vertex, wherein the second transverse groove delimits a first one of the blocks and is separated from the first transverse groove that delimits a circumferentially adjacent block by a solid tread portion, wherein the first common vertex is separated from the second circumferential groove by a continuous circumferential tread rib, wherein the solid tread portion extends from the first circumferential groove to the continuous circumferential tread rib, and wherein the solid tread portion forms a single body with the continuous circumferential tread rib, spacing the first block and the circumferentially adjacent block from each other; and a second circumferential row of blocks disposed between the second circumferential groove and a third circumferential groove, wherein each of the blocks of the second circumferential row of blocks is delimited by a section of the second circumferential groove and by third and fourth transverse grooves that extend from the second circumferential groove and converge and terminate at a second common vertex, wherein the first and second transverse grooves and the third and fourth transverse grooves extend from the respective first and second circumferential grooves in the same lateral direction of the tread, and wherein, for at least one of the first and second circumferential rows of blocks, the common vertex of each block is located at a position laterally intermediate the circumferential groove that delimits the blocks of the respective row of blocks and a portion of one of the transverse grooves that delimits the block.

* * * * *